United States Patent
Skocypec et al.

(10) Patent No.: US 10,200,954 B2
(45) Date of Patent: Feb. 5, 2019

(54) DYNAMICALLY ADJUSTABLE NODES IN A SENSOR NETWORK

(71) Applicant: Big Belly Solar, Inc., Newton, MA (US)

(72) Inventors: David J Skocypec, Medfield, MA (US); Brian Scot Phillips, Sherborn, MA (US); Michael E Feldman, Framingham, MA (US)

(73) Assignee: BIG BELLY SOLAR, INC., Newton, MA (US)

( * ) Notice: Subject to any disclaimer, the term of this patent is extended or adjusted under 35 U.S.C. 154(b) by 0 days.

(21) Appl. No.: 15/117,489

(22) PCT Filed: Feb. 10, 2015

(86) PCT No.: PCT/US2015/015239
§ 371 (c)(1),
(2) Date: Aug. 9, 2016

(87) PCT Pub. No.: WO2015/120463
PCT Pub. Date: Aug. 13, 2015

(65) Prior Publication Data
US 2016/0353385 A1    Dec. 1, 2016

Related U.S. Application Data

(60) Provisional application No. 61/937,961, filed on Feb. 10, 2014, provisional application No. 62/037,368, filed on Aug. 14, 2014.

(51) Int. Cl.
*H04W 52/02* (2009.01)
*H04W 4/021* (2018.01)
(Continued)

(52) U.S. Cl.
CPC ....... *H04W 52/0261* (2013.01); *H04W 4/021* (2013.01); *H04W 4/70* (2018.02); *H04Q 2209/25* (2013.01); *H04W 76/27* (2018.02); *H04W 76/28* (2018.02); *H04W 84/18* (2013.01); *Y02D 70/00* (2018.01); *Y02D 70/1222* (2018.01); *Y02D 70/142* (2018.01); *Y02D 70/144* (2018.01);
(Continued)

(58) Field of Classification Search
None
See application file for complete search history.

(56) References Cited

U.S. PATENT DOCUMENTS

| | | | | |
|---|---|---|---|---|
| 2007/0266078 A1* | 11/2007 | Rittle | ...................... | H04L 67/12 709/203 |
| 2008/0192713 A1* | 8/2008 | Mighani | ............... | H04W 84/00 370/338 |
| 2013/0109406 A1* | 5/2013 | Meador | ................. | H04L 67/125 455/456.1 |

OTHER PUBLICATIONS

Jaggi, "Node Activation Policies for Energy-Efficient Coverage in Rechargeable Sensor Systems". May 2007, entire document.*

* cited by examiner

*Primary Examiner* — Mohammad S Adhami

(57) ABSTRACT

Systems, methods, and computer-readable storage media for dynamically adjusting nodes in a mesh network embedded in objects. The nodes, which are individually capable of sensing and/or transmitting data, are paired together such that when one node is active, the other node is collecting energy via solar, wind, or other energy collecting means. When a node reaches a certain energy level, the nodes can switch status, such that the passive node becomes active and vice versa. Exemplary objects in which the systems can be embedded include benches, receptacles, and light fixtures.

26 Claims, 6 Drawing Sheets

(51) Int. Cl.
*H04W 4/70* (2018.01)
*H04W 84/18* (2009.01)
*H04W 76/27* (2018.01)
*H04W 76/28* (2018.01)

(52) U.S. Cl.
CPC .......... *Y02D 70/146* (2018.01); *Y02D 70/164* (2018.01); *Y02D 70/22* (2018.01); *Y02D 70/26* (2018.01)

DYNAMICALLY ADJUSTABLE NODES IN A SENSOR NETWORK

CROSS REFERENCE TO RELATED APPLICATIONS

This application claims the benefit of priority to U.S. Provisional Application No. 62/037,368, filed on Aug. 14, 2014, entitled "DYNAMICALLY ADJUSTABLE NODES IN A SENSOR NETWORK", and U.S. Provisional Patent Application No. 61/937,961, filed on Feb. 10, 2014, entitled "SECURITY TECHNOLOGIES FOR ELECTRICALLY-POWERED TRASH COMPACTORS AND RECEPTACLES," all of which are expressly incorporated by reference herein in their entirety.

BACKGROUND

1. Technical Field

The present disclosure relates to sensor networks and more specifically to adjusting the status of nodes within a sensor network according to a service plan and power requirements.

2. Introduction

Mesh networks are networks where nodes act as both end points and as relay points for other nodes. Such networks are useful for their flexibility and redundancy. Wireless mesh networks can be implemented using wireless technology, such as Wi-Fi (802.11, 802.15, 802.16, etc.), cellular communications, radio repeaters, etc. However, when seeking to provide coverage over an area using a mesh network, a concern can be the reliability of the coverage. For instance, if the nodes in a mesh network are mobile, the specific areas covered at any point can change, resulting in areas with no network connection. Similarly, the power capabilities of individual nodes in the mesh network can create service disruptions at various periods in a day. More specifically, both Wi-Fi and cellular communications have significant power requirements to maintain a mesh node and communicate with non-node devices, which must be met in order to maintain connectivity.

Such power requirements are greatly complicated in specific settings, such as public settings or high-service areas. Here, the service connectivity provided by the nodes in the mesh network can largely depend on power capabilities, service requirements, and reachability of each of the nodes, as well as the arrangements of the group of nodes. Improper arrangements of nodes, insufficient power capabilities, or inadequate reachability of one or more nodes—all can create service disruptions which can be greatly inconvenient, particularly in high-service areas.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to dynamically adjust nodes in a network, such as a mesh network, to maintain power capabilities and service reachability based on the nodes in the network which are selected to be active and inactive. The nodes can include objects having one or more sensors or signaling systems and power capabilities. In some cases, the nodes can be publicly available objects, such as storage receptacles, including trash cans, compactors, and recycle cans; traffic objects, such as signs and/or traffic lights; posts, such as light posts; benches, such as work benches, park benches, or picnic benches; public transportation objects, such as subway entrances, bus terminals, train car columns; end caps; neighborhood signs and objects; etc. In some cases, examples of publically available objects can include, but are not limited to: benches, storage receptacles (such as trashcans, dumpsters, soda machines, recycling bins, etc.), stoplights, signs (including traffic signs and/or enterprise specific signs), telephone poles, posts, lights, mailboxes, guardrails, and so forth.

However, it will be readily understood by one of ordinary skill in the art that this objects and nodes as used herein can apply to any type of objects, devices, or structures, including a wide variety of objects or structures, such as park benches, and ranging from basic to very specific. For example, objects or nodes can include from broad or generic to very specific and detailed park benches, work benches, kiosks, rain shelters, building structures, tubing, charging stations, Wi-Fi points, outdoor event structures—both permanent and temporary—and other items or sites that may be placed in an area or which people may use or congregate near. In addition, the size and features of the objects and nodes can vary by implementation, circumstances, requirements, setup, nodes, objects, planned system, etc. The objects or nodes can be small or large enough to include power and signaling capabilities or otherwise connect to another object which may provide power and signaling capabilities.

Furthermore, in some cases, a node or object may refer to a single node or object, but can also refer to multiple nodes or objects. For example, in some cases, a node can refer to a cluster of objects which together form a node implemented as an object in the current invention. In other examples, a node can refer to a single node serving as either a standalone object with power and signaling capabilities or being attached to one or more separate devices providing additional features or functionalities, such as power, signaling, displaying, logic, memory, storage, alerting, audio, visual, or any other functionalities.

The nodes can be placed or located together in groups of two or more based on proximity. For example, nodes can be paired or adjacently placed such that each pair is co-located within a vicinity. Being a co-located pair can being the two nodes are immediately adjacent to one another or within some threshold distance. For example, two trashcans, on opposite corners of an intersection, could be paired together because they are co-located on the same intersection. Alternatively, a bench and a trash can on opposite ends of a same block could also be paired together based on their co-location in the same block. In various embodiments, determining co-location can be a function of the range of sensors, Wi-Fi, radio communications, or other functionality being performed.

When a first node in a pair of co-located nodes is active (for example, actively transmitting/receiving a Wi-Fi signal) and a second node in the pair of co-located nodes is inactive, a system configured per this disclosure can perform the following steps. The second node can receive a first energy level corresponding to energy in the first node and a current status of the first node. An exemplary energy level could be a voltage remaining in batteries of the first node, or an indication of how much time the node has remaining before reaching a specified power level (such as a critical or shut-off power level). The current status of the first node could be how much data is being transmitted or communicated by the node, how much power is being consumed by specific sensors and/or transceivers, or how long the node has been in an active state. Alternative information which could be received includes an estimate of how long the energy level will remain above a threshold based on the current usage, how much overlap there is with other nodes in the mesh network, how much energy is available in each of the mesh network nodes, how much demand or consumption of energy or sensor data is required at a particular point or range in time, etc.

The second node also identifies, via a processor or analog means, how much energy is available to the second node. That is, the second node determines its own power level. Based on the second energy level (i.e., the energy level of the second node), the first energy level (the energy level of the first node), and the current status of the first node, the second node or a remote management system can determine when an active status of the first node should be switched from the first node to the second node. When the second node or remote management system determines the active status should be switched between nodes in the pair of co-located nodes, the second node is activated and the first node is deactivated. Such activation/deactivation can be initiated by control signals from the second node, the remote management system, or a "master" node, with the control signals being distinct from the data collected by sensors in the nodes or transmitted/received as part of a wireless communication or remote management system.

In some cases, one embodiment can include a trashcan, compactor, or storage receptacle on an opposite corner of an intersection from another, similarly configured trashcan, compactor, or storage receptacle. For example, the two trashcans can be paired together as nodes in a mesh network of nodes. Each of the nodes in the mesh network are powered using solar power collectors which charge batteries stored in the nodes. Other configurations could be powered using wind energy, geothermal energy, steam energy, or any other "renewable" energy resource. In other embodiments, the nodes can include other objects, such as benches, posts, or post office boxes, and can be different from each other. In other words, paired nodes can be the same type of nodes, such as two of the same or similar trashcans, but can also be different, such as a trashcan paired with a telephone station.

While one node in the pair is "active," the other node can be inactive and passively collecting and storing energy for later use. The active node, in addition to communicating with the mesh network (including its partner node it is paired with) or sending signals for nearby devices, such as user mobile phones, can record data using sensors and forward that data elsewhere, such as to a remote management system, using communications interfaces at the nodes. In some cases, however, while one node is active, the other node in the pair can also be active for an overlapping period of time. Thus, activity and/or inactivity can overlap based on a plan and configuration.

Example sensors can include precipitation sensors, light sensors, pollution sensors, movement sensors, traffic sensors, heat/temperature sensors, RF/electromagnetic energy activity sensors, Wi-Fi interfaces, or any other type of sensor or interface for collecting data by the node. In addition to sensors, the active node could be acting as a Wi-Fi (or radio or cellular) relay and access point or repeater.

An intersection can have two storage receptacles, for example. One can be passively collecting energy for later use. The other can be transmitting and receiving a Wi-Fi signal. When the power level of the active storage receptacle gets to a certain level, the two storage receptacles can swap active status, with the previously active storage receptacle collecting energy for the next time the storage receptacle is transmitting/receiving Wi-Fi and the previously passive storage receptacle now communicating the Wi-Fi instead. The change in activity by the storage receptacles can be initiated by the storage receptacles, a remote management system, or a separate node in the network.

It should be noted that the active storage receptacles can still collect solar or other energy while in an active state. However, because of the active state, the rate of charging will often be diminished. Therefore, the switching between co-located nodes in the mesh network allows one node to charge while the other is active, while simultaneously providing full coverage of an area via sensors, Wi-Fi/cellular coverage, or other active module activity.

It is also noted that because the nodes are part of a network, other configurations can combine nodes into groups of more than two, with more than one active or inactive node at a time. For example, a group of 4 nodes could be co-located within an area, and with a single node active and three passively storing energy at any given time. In addition, the objects containing the communication equipment to connect each node to the network and provide needed sensors/transmission/reception equipment needed can be any publically accessible objects. Non-limiting examples of such objects include benches, storage receptacles (such as trashcans, recycling bins, soda machines, newspaper machines), stoplights, signs (such as a stop sign, a business sign, a welcome sign), a telephone pole, a post, a light, and a guardrail.

Further, the area of the network can encompass any predefined area, such as one or more blocks, one or more neighborhoods, one or more cities, one or more acres, one or more lots, one or more stores, etc. For example, the nodes in the network can be placed around a city in a manner that allows the nodes to be co-located such that activity, signaling, and energy can be distributed between the co-located nodes to maintain a continuous activity, signaling, and energy.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

A system, method and computer-readable media are disclosed which dynamically adjust nodes in a mesh network, where the nodes are embedded in public objects. A brief introductory description of a basic general purpose system or computing device in FIG. 1, which can be employed to practice the concepts, is disclosed herein. A more detailed description and variations of electrically-powered receptacles, as well as systems for dynamically adjustment sensors and compactions will then follow. These variations shall be described herein as the various embodiments are set forth. The disclosure now turns to FIG. 1.

Figure 1:
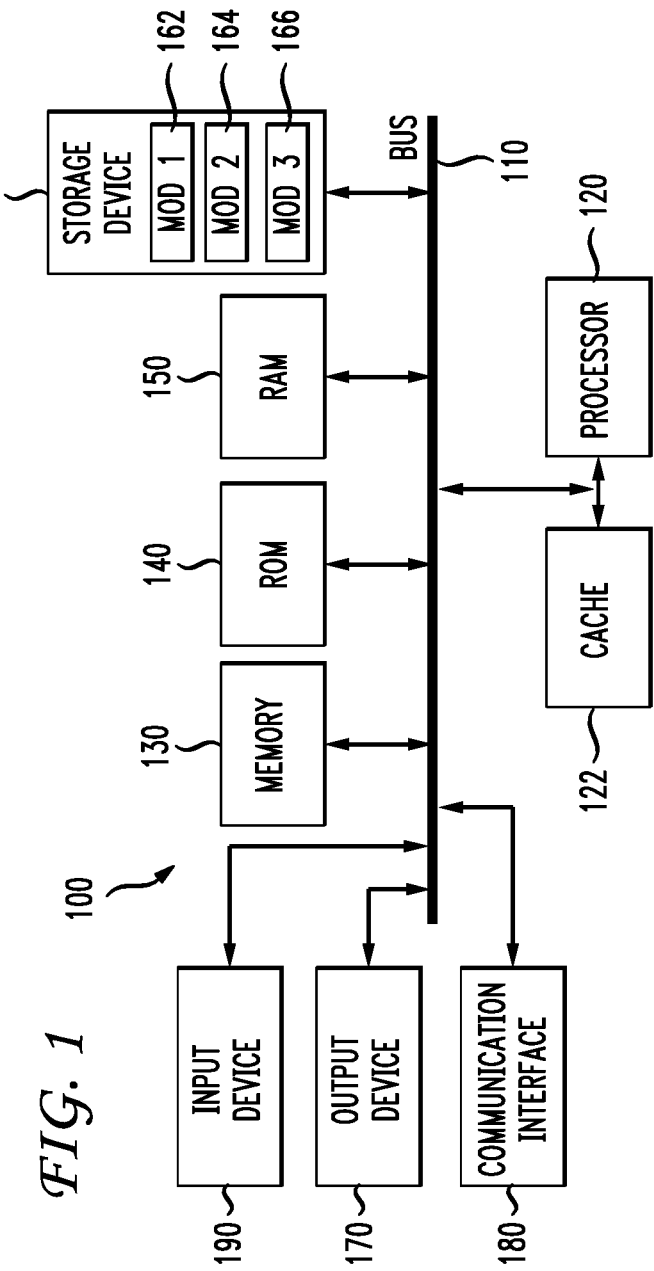
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
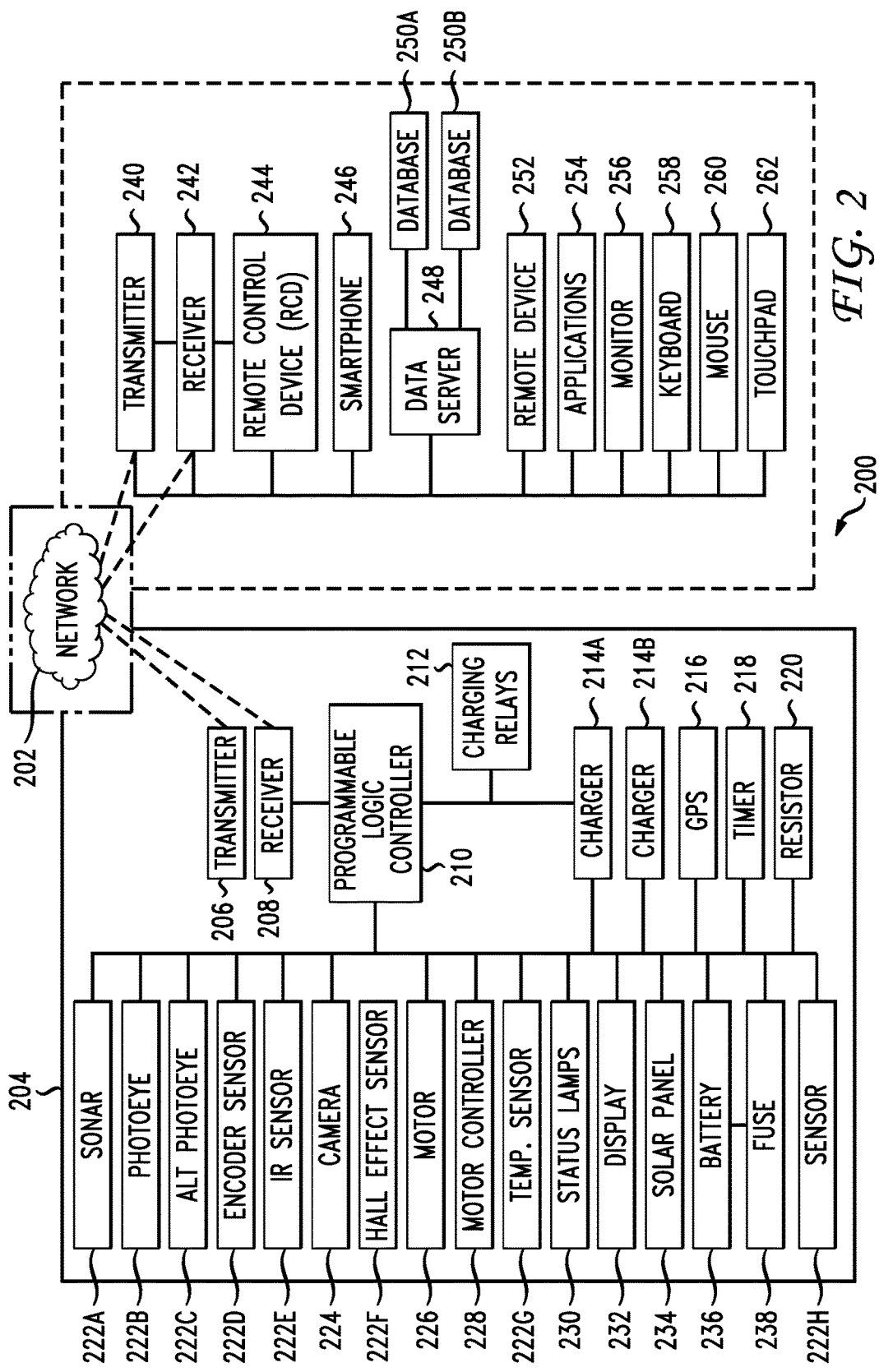
FIG. 2 illustrates an example architecture for remotely controlling electrically-powered compactors or other publically available object.

Having disclosed some components of a computing system, the disclosure now turns to FIG. 2, which illustrates an exemplary architecture for controlling electrically-powered compactors both locally and remotely via a network. Receptacle 204 can be an electrically-powered receptacle for collecting waste, such as trash and recyclables, for example. While a receptacle 204 is illustrated, other publically available objects, such as light posts, stoplights, or other objects can be similarly controlled and powered. As illustrated, receptacle 204 can be, for example, a solar, wind, geothermal, or battery-powered receptacle and/or compactor. Preferably, the receptacle 204 can recharge while in an inactive state. Moreover, receptacle 204 can include a motor 226 for performing various operations, such as compaction operations. Not shown in the figures is the actual structure for compaction. However, in general, the system in FIG. 2 will include control to utilize power in the battery 236 to run a motor 226 that performs compaction on the trash within a bin inside the receptacle. Further, receptacle 204 can be remotely controlled via remote control device (RCD) 244. The RCD can be another node in a mesh network or can be a controlling device which is not a node. To this end, receptacle 204 can include transmitter 206 and receiver 208 for communicating with RCD 244. In particular, transmitter 206 and receiver 208 can communicate with transmitter 240 and receiver 242 on RCD 244, and vice versa. Here, transmitters 206 and 240 can transmit information, and receivers 208 and 242 can receive information, such as control information. This way, receptacle 204 and RCD 244 can be connected to transmit and receive information, such as instructions, commands, statistics, alerts, notifications, files, software, data, and so forth. Receptacle 204 can also communicate with other devices, such as a server and/or a collection vehicle, via transmitter 206 and receiver 208. Similarly, RCD 244 can communicate with other devices, such as a server and/or a user device 246, 252, via transmitter 240 and receiver 242.

Moreover, receptacle 204 and RCD 244 can communicate with each other and/or other devices via network 202. The network 202 can include a public network, such as the Internet, but can also include a private or quasi-private network, such as an intranet, a home network, a virtual private network (VPN), a shared collaboration network between separate entities, etc. Indeed, the network 202 can include many types of networks, such as local area networks (LANs), virtual LANs (VLANs), corporate networks, wide area networks, a cell phone transmitter and receiver, a WiFi network, a Bluetooth network, and virtually any other form of network.

Transmitter 206 and receiver 208 can be connected to printed circuit board (PCB) 210, which controls various functions on receptacle 204. In some embodiments, the RCD 244 can be incorporated within the PCB 210. In FIG. 2, the RCD 244 is electrically connected to the PCB 210 via transmitters 206, 240 and receivers 208, 242. The RCD 244 can be connected to transmitter 240 and receiver 242 via a two-way communication port, which includes transmitter 240 and receiver 242. The PCB 210 can control electrical functions performed by the receptacle 204. Electrical functions can include, for example, running compactions by actuating a motor 226; sensing waste or recyclables volume inside the receptacle 204 using a sensor at regular or programmable intervals, such as a sonar-based sensor 222A, a proximity sensor, and/or photoeye sensors 222B-C; changing status lamps 230 at regular and/or programmable thresholds to/from a color indicating that the receptacle 204 is not full (e.g., green), to/from a color indicating that the receptacle 204 is almost full (e.g., yellow), to/from a color indicating that the receptacle 204 is full (e.g., red); etc.

The RCD 244 can enable remote control and/or alteration of the functions performed or operated by the PCB 210, including placing the receptacle 204 in an active and/or passive state. The RCD 244 can also provide access to, and control over, the various components 206, 208, 210, 212, 214A-B, 216, 218, 220, 222A-H, 224, 226, 228, 230, 232, 234, 236, 238 of the receptacle 204. Users can use a networked device, such as smartphone 246 and/or remote device 252, to communicate with the RCD 244 in order to manage and/or control the receptacle 204. For example, a user can communicate with the RCD 244 via the remote device 252 to change a threshold value on the PCB 210, which can control, for example, a collection timing; the compaction motor 226; the use of energy on a lighted advertising display, such as display 232; the status lamps 230; the sensors 222A-G; the camera 224; etc. The remote device 252 can include virtually any device with networking capabilities, such as a laptop, a portable media player, a tablet computer, a gaming system, a smartphone, a global positioning system (GPS), a smart television, a desktop, etc. In some embodiments, the remote device 252 can also be in other forms, such as a watch, imaging eyeglasses, an earpiece, etc.

The remote device 252 and RCD 204 can be configured to automatically modify the PCB's 210 operating parameters. However, users can also manually modify the PCB's 210 operating parameters via the remote device 252 and RCD 204. The operating parameters can be modified in response to, for example, evolving industry benchmarks; user inputs; historical data, such as the data gathered from a separate database 250A-B; forecasted data, such as upcoming weather characteristics; traffic conditions; a collection schedule; a collection route; a proximity of a collection vehicle; a time and/or date; a location; a capacity, such as a capacity of the receptacle 204 and/or a capacity of a collection vehicle; a fullness state of the receptacle 204; lapsed time between collections; lapsed time between compactions; usage conditions of the receptacle 204; energy usage; battery conditions; statistics; a policy; regulations; a detected movement of an object, such as an object inside or outside of the receptacle 204; collection trends; industry and/or geographical standards; zoning policies and characteristics; real-time information; user preferences; and other data. The data from the remote device 252 can be relayed to the RCD 244, and the data from the RCD 244 can be relayed, via the network 202, to the receptacle 204 and/or the remote device 252 for presentation to the user.

The user can control the RCD 244 and/or access and modify information on the RCD 244 via a user interface, such as a web page, an application 254, a monitor 256, and/or via voice messages and commands, text messages, etc. The remote device 252 can include a user interface, which can display, for example, graphs of collection statistics and trends (e.g., collection frequency, usage, temperature, etc.), collection reports, device settings, collection schedules, collection configurations, historical data, status information, collection policies, configuration options, device information, collection routes and information, alerts, etc. This way, users can access information to make educated decisions about how to set and/or reset operating parameters on the PCB 210; to control, for example, which sensors are used to gather data, which thresholds to set; to control outputs from the status lamps 230 and other components; etc. User can change settings on the receptacle 204, such as optimal collection timing, timing of sensor actuation; and/or modify parameters, such as desired capacity and fullness thresholds; using a scroll down menu, click-and-slide tools, interactive maps displayed on the remote device 252, touch screens, forms, icons, text entries, audio inputs, text inputs, etc. In response, the RCD 244 can automatically reconfigure the PCB 210 settings, recalibrate sensors and displays, change operating parameters, etc.

The RCD 244 can include a two-way communication port that includes transmitter 240 and receiver 242, which can wirelessly communicate with the PCB 210 of the receptacle 204, via the transmitter 206 and receiver 208 on the receptacle 204, which are connected electrically to the PCB 210. On scheduled and/or programmable intervals, the PCB's 210 transmitter 206 can send data to a central server, such as data server 248, via the network 202. The same transmitter 206 and receiver 208 can be used to communicate with other nodes (whether receptacles, benches, or other public objects) in a mesh network. Moreover, the RCD's 244 receiver 242 can be configured to query the data server 248, which can also be connected to the remote device 252, for incoming data. The data server 248 can communicate data from databases 250A-B. If there is no data to be received by the receiver 208, the PCB 210 can be configured to promptly return to a low-power mode, where the transmitter 206 and receiver 208 circuits are turned off, until another scheduled, received, initiated, and/or programmed communication event. Such a low-power mode can be the same as an "inactive" mode, or can be distinct from an "inactive" mode because the sensor/transmitter being used are distinct from the transmitter 206 and receiver 208. If there is data to be received by the receiver 208, such as a command to turn the receptacle 204 off and then back on, a command to change the thresholds upon which compactions are operated, a command to change the thresholds for providing status updates and/or determining fullness states, etc., then the RCD receiver 242 can download the new data from the data server 248, via the RCD 244, to the PCB 210, altering its operating configuration. The RCD receiver 242 can also be configured to send data to the data server 248 to acknowledge the receipt of data from the PCB 210, and to send selected data to the remote device 252, the smartphone 246, and/or any other device, for presentation to a user.

The data server 248 can also display the data to a user on remote device 252, smartphone 246, or any other device. The data can be a password-protected web page, a display on the smartphone 246, a display on the monitor 256, etc. Remote control using the RCD 244 to reconfigure operating thresholds, sensor use, sensor hierarchy, energy usage, etc., can enable the receptacle 204 to alter characteristics that control its energy generation, energy consumption, and/or the collection and management logistics, further enabling sound operation of the receptacle 204.

The RCD 244 can be configured to communicate over a wireless network with the PCB 210, and transmit data to the data server 248, so the data can be stored for viewing and manipulation by a user via any web-connected computer, phone, or device. The RCD 244 can also be configured to receive data from the data server 248, and transmit the data back to the PCB 210. The PCB 210 can be electrically connected to a variety of sensors, such as sensors 222A-H, within the receptacle 204. Through the RCD 244, the PCB 210 can also be wirelessly connected to the databases 250A-B, and/or other external databases, such as a weather database, which may, for example, reside on a National Oceanographic and Atmospheric (NOAA) server, a database of trucks and locations and schedules, which may reside on a waste hauler's server, a database of traffic conditions, etc. A user can also change which of the sensors 222A-H are used in setting thresholds, among other things, in response to, for example, user commands and/or changes in outside data, such as weather data or truck location data.

The PCB 210 can also communicate with a temperature sensor 222G to gather temperature information, which can be transmitted to the RCD 244 via the PCB transmitter 206. The temperature information can be used, among other things, to fine tune operational functions and energy consumption of the receptacle 204. For example, the PCB 210 can be reconfigured to run less compaction per day, such as four to eight compactions, in cold weather, since batteries are less powerful in cold weather. Coinciding with cold weather, the winter days are shorter, thus solar energy and battery power is limited. In order to conserve power on low-sunlight days, the RCD 244 can adjust the PCB's 210 normal fullness sensitivity levels, so that collections are prompted to be made earlier. For example, if the PCB 210 typically runs 20 compactions before changing status lamps from green to yellow, a signal that suggests optimal collection time, the RCD 244 can adjust the thresholds of the PCB 210 to run 10 compactions before changing from a green state to a yellow state, thus changing the total energy consumption of the compactor between collections. In a busy location, the PCB 210 can be configured to sense receptacle fullness every minute, whereas in a less busy location, the PCB 210 can be configured to sense fullness once a day.

In some embodiments, the RCD 244 can also alter the timing of events using algorithms based on the results of historical events. For example, the RCD 244 can be initially configured to sense fullness once per minute, but based on resulting readings, it can then alter the timing of future readings. Thus, if three consecutive readings taken at one-minute intervals yield a result of no trash accumulation, the RCD 244 can increase the timing between readings to two minutes, then three minutes, etc., based on the various readings. The RCD 244 can also be configured to adjust sensing intervals based on the level of fullness of the receptacle 204, so it would sense more frequently as the receptacle 204 fills, in order to reduce the margin of error at a critical time, before the receptacle 204 overflows. This "learning feature" can save energy by ultimately synchronizing the sensor readings with actual need to sense. The RCD 244 can also alter thresholds of status lamps 230 based on collection history, the need for capacity as determined by the frequency of red or yellow lights on the receptacle 204, temperatures, expected weather and light conditions, expected usage conditions, etc. The status lamps 230 can be LED lights, for example.

In FIG. 2, the RCD 244 can be enabled, via the PCB 210, to read, for example, a temperature sensor 222G; an encoder sensor 222D, which can measure movement of a compaction ram by utilizing an "encoder wheel" which is mounted on a motor shaft; one or more photoeye sensors 222B-C; door sensors; a sensor which measures current from the solar panel and a sensor which can measure current from the battery 236 to the motor 226; a hall effect sensor 222F, which can detect movement of, for example, a door; an infrared (IR) sensor 222E, a camera 224, etc. In addition, the thresholds set by the RCD 244 can be based on historical and real-time information, user preferences, industry norms, weather patterns and forecasts, and other information. The RCD 244 can reset the PCB's 210 normal thresholds hourly, daily, weekly, monthly, yearly, or at adjustable intervals, based on a variety of information and user decisions.

The RCD 244 can also alter the PCB's 210 normal hierarchy of sensor usage. For example, if the PCB 210 is configured to run a compaction cycle when one or more of the photoeyes 222B-C located inside the receptacle 204 are blocked, the RCD 244 can reconfigure the sensor hierarchy by reconfiguring the PCB 210 to run compaction cycles after a certain amount of time has passed, by reading the position of the encoder sensor 222D at the end of a cycle, by reading one or more photoeye sensors 222B-C, by calculating a sensor hierarchy based on historical filling rates, by a change in user preferences, etc. Using an aggregate of data from other receptacles located worldwide in a variety of settings, the RCD's 244 configurations can depend on constantly evolving parameters for optimizing energy utilization, capacity optimization, and operational behavior, among other things. The RCD 244 innovation and growing database of benchmarks, best practices and solutions to inefficiency, enables the receptacle 204 to adapt and evolve.

Based on the data from the PCB 210, the sensors, inputs by the users (e.g., the customer or the manufacturer) via the RCD 244, and/or based on other data, such as historical or weather data, the RCD 244 can change the PCB 210 thresholds, operational parameters, and/or configuration, to improve the performance of the receptacle 204 in different geographies or seasons, or based on different user characteristics or changing parameters. Thus, the system and architecture can be self-healing.

The RCD 244 can also be configured to change the PCB's 210 normal operating parameters. For example, the RCD 244 can be configured to cause the PCB 210 to run multiple compaction cycles in a row, to run energy through a resistor 220 to apply a strong load upon the battery 236, which can supply the energy. The RCD 244 can measure battery voltage at predetermined or programmable intervals, to measure the "rebound" of the battery 236. A strong battery will gain voltage quickly (e.g., the battery will almost fully recover within 15 minutes or so). A weak battery will drop significantly in voltage (e.g., 3-5 volts), will recover slowly, or will not recover to a substantial portion of its original voltage. By changing the normal parameters of the PCB 210, the battery 236 can be subjected to a heavy load during a test period, which will determine the battery's strength without jeopardizing operations. The RCD 244 can then be configured to relay a message to the user that a battery is needed, or to use the battery differently, for example, by spacing out compactions in time, reducing the degree of voltage decline within a certain time period, etc. Based on the message and any additional information from the RCD 244, the user can then order a new battery by simply clicking on a button on a web page, for example. The RCD 244 can also alter the PCB 210 to do more compactions or other energy-using functions (like downloading software) during the daytime, when solar energy is available to replenish the battery 236 as it uses energy.

Since the RCD 244 can be connected to databases, and can be informed by the PCB 210 on each receptacle of conditions or status information at the respective receptacle, the RCD 244 can also be used to relay data collected from the databases or PCB 210 for other types of servicing events. In other words, the RCD 244 can obtain, collect, maintain, or analyze status, operating, or conditions information received from the PCB 210 of one or more receptacles and/or one or more databases storing such information, and relay such data to a separate or remote device, such as a remote server or control center. For example, the RCD 244 can be configured to relay a message to a waste hauler to collect the receptacle 204 if two or more parameters are met simultaneously. To illustrate, the RCD 244 can relay a message to a waste hauler to collect the receptacle 204 if the receptacle 204 is over 70% full and a collection truck is within 1 mile of the receptacle 204. The RCD 244 can then send a message to the remote device 252 to alert a user that a collection had been made, and the cost of the collection will be billed to the user's account.

In addition, the RCD 244 can change the circuitry between the solar panel 234 and the battery 236, so that solar strength can be measured and an optimal charging configuration can be selected. The charging circuitry 214A-B is illustrated as two circuitries; however, one of ordinary skill in the art will readily recognize that some embodiments can include more or less circuitries. Charging circuits 214A-B can be designed to be optimized for low light or bright light, and can be switched by the RCD 244 based on programmable or pre-determined thresholds. Also, while solar information can be readily available (e.g., Farmers' Almanac), solar energy at a particular location can vary widely based on the characteristics of the site. For example, light will be weaker if reflected off a black building, and if the building is tall, blocking refracted light. For this reason, it can be useful to measure solar energy on site, as it can be an accurate determinant of actual energy availability at a particular location. To do this, the battery 236 and solar panel 234 can be decoupled using one or more charging relays 212. In other aspects, a very high load can be placed on the battery 236 to diminish its voltage, so that all available current from the solar panel 234 flows through a measurable point. This can be done, for example, by causing the receptacle 204 to run compaction cycles, or by routing electricity through a resistor, or both.

There are a variety of other methods which can be used to create a load. However, putting a load on the battery 236 can cause permanent damage. Thus, the RCD 244 can also be configured to disconnect the battery 236 from the solar panel 234, instead routing electricity through a resistor 220. This can allow for an accurate measurement of solar intensity at a particular location, without depleting the battery 236, which can help assess the potential for running compactions, communicating, powering illuminated advertisements, and powering other operations. In some embodiments, the PCB 210 can be reconfigured by the RCD 244 to run continuous compaction cycles for a period of time, measure solar panel charging current, relay the data, and then resume normal operations. Different configurations or combinations of circuits can be used to test solar intensity, battery state or lifecycle, and/or predict solar or battery conditions in the future.

The RCD 244 can also track voltage or light conditions for a period of days, and alter the state of load and charging based on constantly changing input data. For example, the RCD 244 can configure the timer 218 of the PCB 210 to turn on the display 232 for advertising for a number of days in a row, starting at a specific time and ending at another specific time. However, if the battery voltage declines over this period of time, the RCD 244 can then reduce the time of the load (the display 232) to every other day, and/or may shorten the time period of the load each day. Further, the RCD 244 can collect information on usage and weather patterns and reconfigure the PCB's 210 normal operating regimen to increase or reduce the load (for example, the advertisement on the display 232) placed on the battery 236, based on the information collected. For example, if it is a Saturday, and expected to be a busy shopping day, the RCD 244 can allow a declining state of the battery 236, and can schedule a period on the near future where a smaller load will be placed on the battery 236, by, for example, not running the advertisement on the coming Monday. In doing so, the RCD 244 can optimize the advertising value and energy availability to use energy when it is most valuable, and recharge (use less energy) when it is less valuable. In order to maximize solar energy gained from a variety of locations, the RCD 244 can cause the PCB 210 to select between one of several charging circuits. For example, if it is anticipated that cloudy conditions are imminent, the RCD 244 can change the circuit that is used for battery charging, in order to make the charger more sensitive to lower light conditions. In a sunny environment, the charger circuit used can be one with poor low-light sensitivity, which would yield more wattage in direct sunlight.

The architecture 200 can also be used for monitoring functions, which can enable users to access information about the receptacle 204 and collection process. With this information, users can make judgments that facilitate their decision-making, helping them remotely adjust settings on the receptacle 204 to improve performance and communication. For example, the RCD 244 can be configured to enable users to easily adjust callback time, which is the normal time interval for communication that is configured in the PCB 210. The RCD 244 can enable the user to alter this time setting, so that the receptacle 204 communicates at shorter or longer intervals. Once the PCB 210 initiates communication, other parameters can be reconfigured, such as awake time, which is the amount of time the receiver is in receiving mode. This enables users to make "on the fly" changes. In some cases, the PCB 210 can shut down after sending a message and listening for messages to be received. In these cases, it can be difficult to send instructions, wait for a response, send more instructions and wait for response, because the time lapse between normal communications can be a full day. However, by remotely adjusting the setting through the RCD 244, the user can make continuous adjustments while testing out the downloaded parameters in real time, and/or close to real time. This can enhance the ability of the user to remotely control the receptacle 204.

Further, the RCD 244 can alter the current of the photoeyes 222B-C, in a test to determine whether there is dirt or grime covering the lens. Here, the RCD 244 can reconfigure the normal operating current of the photoeyes 222B-C. If the lens is dirty, the signal emitter photoeye will send and the signal receiver will receive a signal on high power, but not on low power. In this way, a service call can be avoided or delayed by changing the normal operating current to the photoeyes 222B-C. This can be a useful diagnostic tool.

In some embodiments, regular maintenance intervals can be scheduled, but can also be altered via information from the RCD 244. The RCD 244 can be configured to run a cycle while testing motor current. If motor current deviates from a normal range (i.e., 2 amps or so), then a maintenance technician can be scheduled earlier than normal. The RCD 244 can send a message to the user by posting an alert on the users web page associated with the receptacle 204.

Other settings can be embodied in the receptacle 204 as well. For example, the PCB 210 can sense that the receptacle 204 is full. The RCD 244 can then configure the PCB 210 to have a web page, or another display, present a full signal. The RCD 244 can alter when the full signal should be presented to the user. For example, after accessing a database with historical collection intervals, the RCD 244 can reconfigure the PCB 210 to wait for a period of time, e.g., one hour, before displaying a full signal at the web page. This can be helpful because, in some cases, a "false positive" full signal can be signaled by the PCB 210, but this can be avoided based on historical information that indicates that a collection only a few minutes after the last collection would be highly aberrational. The RCD 244 can thus be configured to override data from the PCB 210. Instead of sending a full signal to the user, the RCD 244 reconfigures the PCB 210 to ignore the full signal temporarily, and delay the display of a full-signal on the users' web page or smart phone, in order for time to go by and additional information to be gathered about the receptacle's actual fullness status. For example, when a collection is made and ten minutes later, the fullness sensor detects the receptacle 204 is full, the fullness display message on the web page can be prevented from displaying a full status. In some cases, the bag can be full of air, causing the proximity sensor in the receptacle 204 to detect a full bin. Within a certain time period, e.g., twenty minutes in a busy location, a few hours in a less busy location, as determined based on the historical waste generation rate at the site, the bag can lose its air, and the proximity sensor can sense that the bin is less full than it was twenty minutes prior, which would not be the case if the bin was full with trash instead of air. Thus, "false positive" information can be filtered out.

Likewise, tests and checks can be performed so that false negative information is avoided as well. For example, if a bin regularly fills up daily, and there is no message that it is full after two or three days, an alert can appear on the users' web page indicating an aberration. Thresholds for normal operating parameters and adjustments to normal can be set or reset using the RCD 244, or they can be programmed to evolve through pattern recognition. Although many operating parameter adjustments can be made through the web portal, adjustments can also be made automatically. This can be controlled by a software program that aggregates data and uses patterns in an aggregate of enclosures to alter PCB 210 settings on a single enclosure. For example, if the collection data from 1,000 enclosures indicates that collection personnel collect from bins too early 50% of the time when compaction threshold setting is set to "high", compared to 10% of the time when compaction settings are set at "medium," then the RCD 244 can reprogram the compaction thresholds to the medium setting automatically, so that collection personnel can be managed better, limiting the amount of enclosures that are collected prematurely. Automatic reprogramming, governed by software programs, can be applied to other aspects, such as user response to dynamic elements of the receptacle 204, such as lighted or interactive advertising media displayed on the receptacle 204. For example, if users respond to an LCD-displayed advertisement shown on the receptacle 204 for "discounted local coffee" 80% of the time, the RCD 244 can configure all receptacles within a certain distance, from participating coffee shops, to display the message: "discounted local coffee."

In some embodiments, the RCD 244 can include a data receiving portal for the user with information displays about an aggregate of receptacles. Here, the user can access real-time and historical information of, for example, receptacles on a route, and/or receptacles in a given geography. The data can be displayed for the user on a password-protected web page associated with the aggregate of receptacles within a user group. The receptacle 204 can also display, for example, bin fullness, collections made, the time of collections, battery voltage, motor current, number and time of compaction cycles run, graphs and charts, lists and maps, etc. This data can be viewed in different segments of time and geography in order to assess receptacle and/or fleet status, usage, and/or trends. The users' web page can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular receptacle is displayed after the user clicks on a dot displayed on a map which represents that receptacle. This can allow the user to easily view and interact with a visual map in an external application.

The RCD 244 can be configured to display calculated data, such as "collection efficiency," which is a comparison of collections made to collections required, as measured by the utilized capacity of the receptacle 204 divided by the total capacity of the receptacle 204 (Collection Efficiency=utilized capacity/total capacity). The user can use this information to increase or decrease collections, increase or decrease the aggregate capacity across an area, etc. Typically, the users' goal is to collect the receptacle 204 when it is full—not before or after. The user can click buttons on their web page to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the web page can display a labor cost statistic automatically using information generated from the vehicle usage monitor. As the user clicks on buttons or otherwise makes commands in their web portal, the RCD 244 can change the PCB's 210 operating parameters, usage of sensors, etc., and/or measurement thresholds in response. The RCD 244 can also be configured to automatically display suggested alterations to the fleet, such as suggestions to move receptacles to a new position, to increase or decrease the quantity of receptacles in a given area, to recommend a new size receptacle based on its programmed thresholds, resulting in an improvement in costs to service the fleet of receptacles.

Heat mapping can also be used to provide a graphical representation of data for a user. Heat mapping can show the user the level of capacity in each part of an area, for example a city block, or it can be used to show collection frequency in an area. In each case, the heat map can be generated by associating different colors with different values of data in a cross sectional, comparative data set, including data from a plurality of enclosures. The heat map can be a graphical representation of comparative data sets. In some embodiments, red can be associated with a high number of a given characteristic, and "cooler" colors, like orange, yellow and blue, can be used to depict areas with less of a given characteristic. For example, a heat map showing collection frequency or compaction frequency across 500 receptacles can be useful to determine areas where capacity is lacking in the aggregate of enclosures—a relative measure of capacity. In this case, the highest frequency receptacle can assigned a value of red. Each number can be assigned progressively cooler colors. In other embodiments, the red value can be associated with a deviation from the average or median, for example, a darker red for each standard deviation. The heat maps can be shown as a visual aid on the user's web page, and can color-code regions where "bottlenecks" restrict vehicle and labor efficiency. A small red region can show graphically, for example, that if the user were to replace only ten receptacles with higher-capacity compactors, the collection frequency to a larger area could be reduced, saving travel time. Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which receptacles are of low power, etc. While specific measurements are described herein to demonstrate the usefulness of heat mapping, there are other sets of data that can be represented by the heat maps, which are within the scope and spirit of this invention.

The heat map can also be used to present a population density in one or more areas, as well as a representation of any other activity or characteristic of the area, such as current traffic or congestion, for example. This information can also be shared with other businesses or devices. For example, the RCD 244 can analyze the heat map and share population statistics or activity with nearby businesses or municipalities. The RCD 244 can, for example, determine a high population density in Area A on Saturday mornings and transmit that information to a nearby locale to help the nearby locale prepare for the additional activity. As another example, if the receptacle is placed in a park, the RCD 244 can determine population and activity levels at specific times and alert park officials of the expected high levels of activity so the park officials and/or those managing the receptacle can plan accordingly.

The RCD 244 can also be used for dynamic vehicle routing and compaction and/or receptacle management. Because the RCD 244 can be a two-way communicator, it can both send and receive information between various receptacles and databases, using a mesh network. This can allow the user to cross-correlate data between the fleet of receptacles and the fleet of collection vehicles. The RCD 244 can receive data from the user and/or the user's vehicle. For example, the RCD 244 can receive GPS data or availability data, and use it to change parameters on a given receptacle or aggregate of receptacles. The RCD 244 can receive this data from the users' GPS-enabled smartphone, for example. Similarly, the RCD 244 can send data to the user, a user device, a smartphone, etc., about the status of the receptacle 204. With this two-way data stream, collection optimization can be calculated in real time or close to real time. For example, a collection truck is traveling to the east side of a city and has 30 minutes of spare time. The RCD 244 can receive information about the truck's whereabouts, availability and direction, and query a database for receptacle real time and historical fullness information and determine that the truck can accommodate collections of twenty receptacle locations. The RCD 244 can then display a list of twenty receptacle locations that the truck can accommodate. The user can view a map of the twenty recommended locations, see a list of driving directions, etc. The map of driving directions can be optimized by adding other input data, such as traffic lights, traffic conditions, average speed along each route, etc. At the same time, as the truck heads to the east side of the city, the RCD 244 can reconfigure receptacles on the west side to change compaction thresholds, so that capacity is temporarily increased, freeing up additional time for the truck to spend in the east section. Alternatively, the RCD 244 can reconfigure a receptacle to temporarily display a "full" message to pedestrians, helping them find a nearby receptacle with capacity remaining. The RCD 244 can, in the case where the receptacle requires payment, increase pricing to the almost-full receptacle, reducing demand by pedestrians or other users. This same logic can be effective in situations where trucks are not used, for example, indoors at a mall or airport. The demand for waste capacity can vary, so having remote control over the receptacle 204 can allow users to change settings, parameters, and/or prices to make the collection of waste dynamic and efficient.

The location of the receptacle 204 and other receptacles can be determined via triangulation and/or GPS, for example, and placed on a map in the interactive mapping features. Moreover, the location of an indoor receptacle can be obtained from indoor WiFi hot spots, and the indoor receptacle can be placed on a map in the interactive mapping features. As a staff member accomplishes tasks (i.e., cleaning a bathroom) and moves inside a facility, the staff member's location can be tracked, and the fullness and location of nearby receptacles can be plotted on a map or given to the staff member by other means, as instructions to add a collection activity to the list of tasks. Whether by GPS, Wifi, Bluetooth, etc., triangulation between communication nodes can serve to locate a receptacle on a map, and measurements of fullness of receptacles can be used to create work instructions for staff members or truck drivers, so that efficient routes and schedules can be created to save time.

To better manage the collection process, user groups can be separated between trash and recycling personnel. In many cities, there are separate trucks used to collect separate streams of waste, such as trash and recyclables. For this reason, it can be helpful to configure the user's web page to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular receptacle in the system, view collection efficiency of a particular waste collector, view login history, and/or view industry or subgroup benchmarks, while a waste collector with lower privileges can only view receptacle fullness, for example. The RCD 244 or another device can also be configured to print a list of receptacles to collect next, a list of full or partially full bins, etc. For example, the remote device 252 can be configured to print a list of receptacles to collect in the remaining portion of a route.

Figure 3:
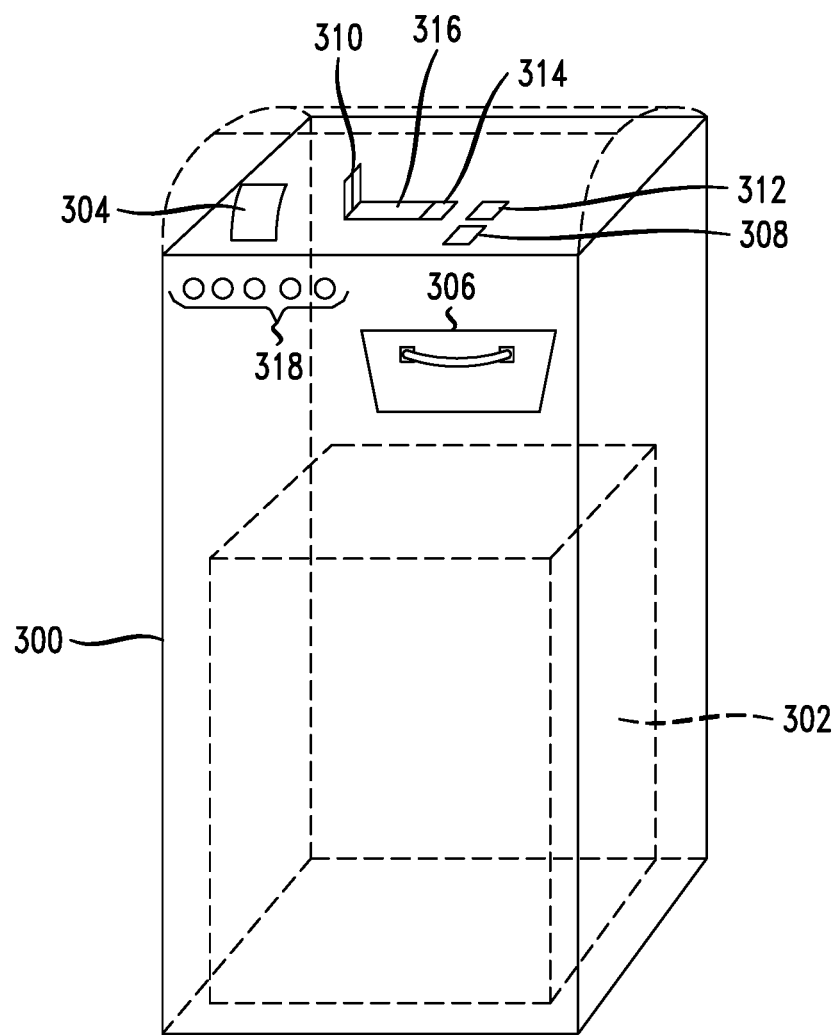
FIG. 3 illustrates an example storage receptacles.

The disclosure now turns to FIG. 3, which illustrates an exemplary storage receptacle 300. The storage receptacle 300 can be configured to dynamically adjusting sensors and compaction operations, as further described below.

The storage receptacle 300 includes a bin 302 for storing content items, and a door 306 for opening the storage receptacle 300 to throw or deposit items in the bin 302. In addition, each of the sensor modules can include an emitter and receiver. Moreover, the storage receptacle 300 can include compactor software or firmware configured to run self-diagnostics on each of the sensor modules and the normal paths, to ensure the storage receptacle 300 is running properly and to report any errors to the management console.

In some configurations, the storage receptacle 300 can also include a sonar sensor 308 to detect objects in the receptacle 300 and calculate the fullness state of the receptacle 300. The signal transmitted and sensed in order to determine trash levels can be any frequency (IR, visual range, etc.) and at any pulse rate. Further, any number and combination of sensors, transmitters, and receivers could be applied in various places within the receptacle 300. The storage receptacle 300 can also include other types of sensors 304, such as an infrared sensor, a temperature sensor, a hall effect sensor, an encoder sensor, a motion sensor, a proximity sensor, etc. The sonar sensor 308 and sensors 304 can sense fullness at regular intervals, and/or based on manual inputs and/or a pre-programmed schedule, for example. Moreover, the sonar sensor 308 and sensors 304 are electrically connected to the printed circuit board (PCB) 316. Further, the sonar sensor 308 and sensor 304 can be actuated by the PCB 316, which can be configured to control the various operations of the storage receptacle 300.

The PCB 316 can control electrical functions performed by the storage receptacle 300. The electrical functions controlled by the PCB 316 can include, for example, running compactions by actuating a motor; sensing waste or recyclables volume inside the receptacle 300 using a sensor at regular or programmable intervals, such as sensors 304; changing status lamps 318 at regular and/or programmable thresholds to/from a color indicating that the receptacle 300 is not full (e.g., green), to/from a color indicating that the receptacle 300 is almost full (e.g., yellow), to/from a color indicating that the receptacle 300 is full (e.g., red); collecting data and transmitting the data to another device; receiving data from another device; managing a power mode; measuring and managing a current; performing diagnostics tests; managing a power source; etc. The motor controller 310 can enable voltage to be applied across a load in either direction. The PCB 316 can use the motor controller 310 to enable a DC motor in the receptacle 300 to run forwards and backwards, to speed or slow, to "brake" the motor, etc.

The storage receptacle 300 includes a transmitter 312 and a receiver 314 for sending and receiving data to and from other devices, such as a server or a remote control device. Accordingly, the storage receptacle 300 can transmit and receive information such as instructions, commands, statistics, alerts, notifications, files, software, data, and so forth. The transmitter 312 and receiver 314 can be electrically connected to the PCB 316. This way, the transmitter 312 can transmit data from the PCB 316 to other devices, and the receiver 314 can receive data from other devices and pass the data for use by the PCB 316. In this regard, a user who is checking the status of the receptacle could drive down the street near the device (say within a wireless range, such as Bluetooth or WIFI, for example), not even get out of their vehicle, but receive a signal indicating that all is well, that the trash needs to be emptied, or that a repair or cleaning is needed.

Status lamps 318 can provide an indication of the status of the storage receptacle 300. For example, the status lamps 318 can indicate the fullness state of the storage receptacle 300. To this end, the status lamps 318 can be configured to display a respective color or pattern when the storage receptacle 300 is full, almost full, not full, etc. For example, the status lamps 318 can be configured to flash red when the storage receptacle 300 is full, yellow when the storage receptacle 300 is almost full, and green when the storage receptacle 300 is not full. Moreover, the status lamps 318 can be LED lights, for example.

The status lamps 318 can also be configured to flash in various patterns to indicate various other conditions. For example, the status lamps 318 can be configured to flash at the same time and in combination to show that the receptacle 300 is full. The status lamps 318 can also be configured to flash in different patterns or times or colors to show troubleshooting status information for example. In some cases, the status lamps 318 can be configured to flash in a predetermined manner to show that a door of the receptacle is open, a component is damaged, an obstacle is stuck, an operation is currently active, etc.

As one of ordinary skill in the art will readily recognize, the receptacle 300 can include other components, such as motors, sensors, batteries, solar panels, displays, relays, chargers, GPS devices, timers, fuses, resistors, remote control devices, cameras, etc. However, for the sake of clarity, the receptacle 300 is illustrated without some of these components.

In some configurations, the storage receptacle 300 can be configured to implement dirt sensing technology. The dirt sensing technology can use firmware or other software instructions to monitor the signals, such as infra-red signals, through the sensors on the receptacle 300, and use this data to determine how dirty the detection sensors have become. For example, in some cases, a "clean" sensor 304D can take around 6 38 khz pulses transmitted from a transmitter 304C before the signal is detected. As the sensor becomes more and more, dirty it typically takes longer to detect the signal, and may even take 20 38 khz pulses, for example. This data can be used to provide a scale of how dirty the sensor has become and provide feedback to the user before the sensor becomes completely blocked. Once the sensor is blocked, the capacity of the compactor can be reduced since compactions may no longer performed. As one of ordinary skill in the art will readily recognize, the frequencies and number of pulses discussed herein are provided for non-limiting illustration purposes. In fact, the frequencies used and number of pulses associated with specific dirt levels can vary based on a number of factors, such as hardware and preference settings. Moreover, other applications, frequencies and number of pulses are contemplated herein.

Furthermore, since the voltage of a battery does not generally indicate the actual capacity in a battery, it can be beneficial to understand what capacity is available to ensure accurate machine operation and dead battery notification. To this end, the machine firmware can analyze voltage drops that occur after a compaction occurs at what current, and can determine a ratio which can provide feedback and indications of the true battery capacity. The machine firmware can also analyze how fast voltage is dropping based on current wireless usage and predict when an alternative node in the mesh network, and particularly the paired node, should be switched to. For example, if the machine firmware detects that the system will have sufficient capacity for 3 hours of work in 20 minutes, the system can configure a switch between nodes to take place in 20 minutes. If the system calculates the other node, in an active state, will reach a critical power level in 15 minutes, the system can cause a transfer to an active state take place sooner than might otherwise have occurred so that coverage continues. The firmware can use a ratio to limit compactions, sensor activity, wireless/cellular activity, and/or notify the management console of the battery state. As previously mentioned, the management console can be a console on the actual storage receptacle 300 and/or a remote device, such as a server, for example.

Figure 4:
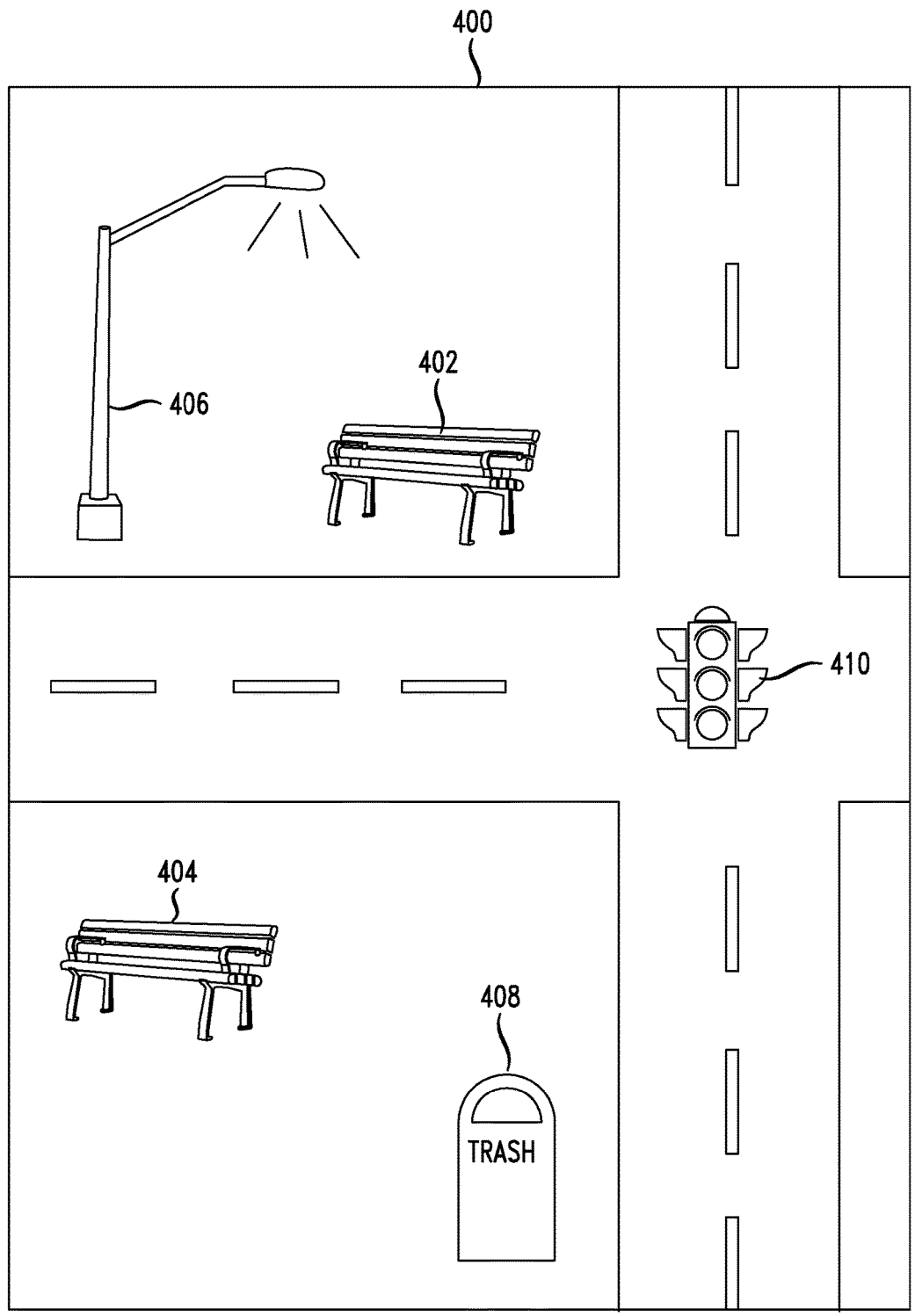
FIG. 4 illustrates an exemplary city grid having multiple potential nodes.

FIG. 4 illustrates an exemplary city grid having multiple potential nodes. In this example 400, an intersection is illustrated having benches 402, 404 on opposite sides of a road. Each bench in this example can be configured to have the disclosed systems embedded into their respective designs. Thus, in one possible embodiment, the two benches 402, 404 could be paired together as co-located nodes in a network, such as a mesh network. Other nodes in the network can be benches as well, or can be other objects such as a lightpost 406, a storage receptacle (as described above) 408, a streetlight 410, a guardrail, signs, or any other object capable of holding or storing a component for transmitting or receiving signals.

Each of the nodes in the network can have distinct ranges for sensors and/or wireless/cellular communications equipment. Alternatively, the ranges for the nodes can be identical to one another, but shifted because the nodes, while co-located within a small physical area, are not actually using a single antenna or sensor. In both circumstances, the ranges for the sensors/transmitters/receivers can vary, which information can be retained in a database, at a central server, or a remote system.

Each node in the network can be collecting data (via sensors) and/or transmitting and receiving signals (e.g., Wi-Fi/cellular/radio signals). In one configuration, the light pole 406 and the receptacle 408 are paired together, performing pollution testing, while the benches 402, 404 are paired together broadcasting a Wi-Fi signal. Each pair of nodes has one active node performing the task while the other node is passively storing energy in a battery via solar or other means. The stoplight 410 can act as a backup for any node should there be a failure or other cause for a node not to activate properly. In such a configuration, all five potential nodes could have sensors and equipment necessary to perform any task, but assigned as previously provided. Alternatively, nodes can be specifically configured for a task and only have the sensors and equipment necessary for that task. Replacement nodes, or nodes in the network capable of replacing any other node, could represent a distinct type of node as compared to the task specific nodes.

Figure 5A:
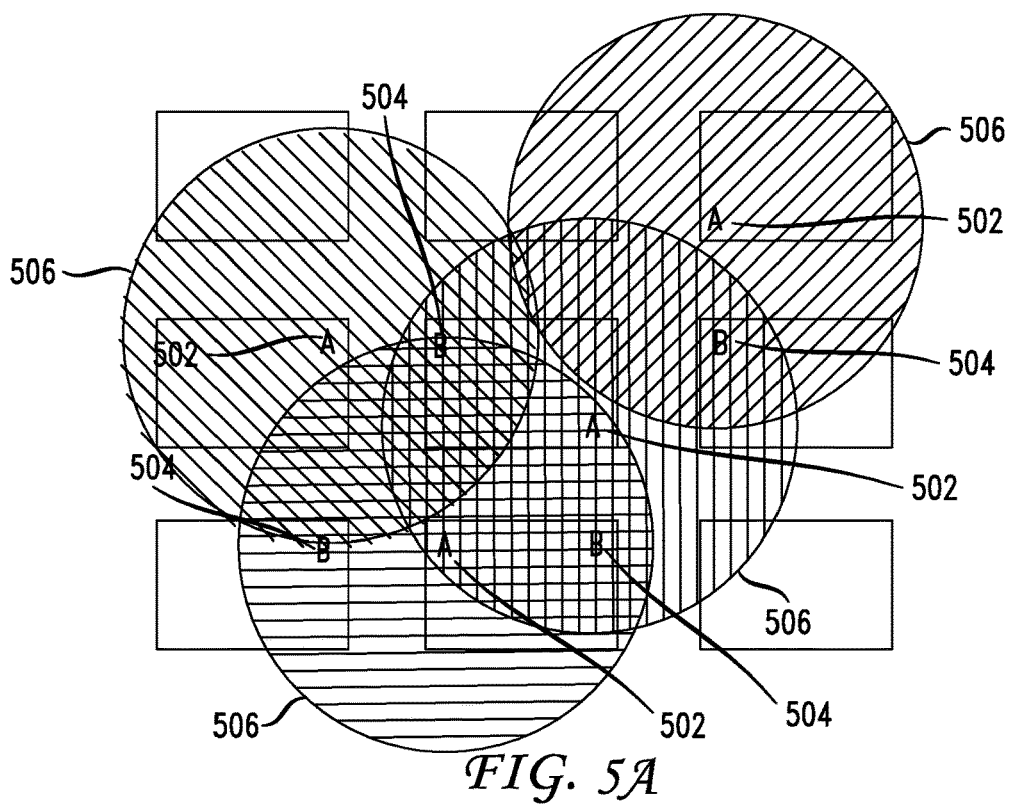
FIGS. 5A and 5B illustrate a city grid having a mesh network enabled.
Figure 5B:
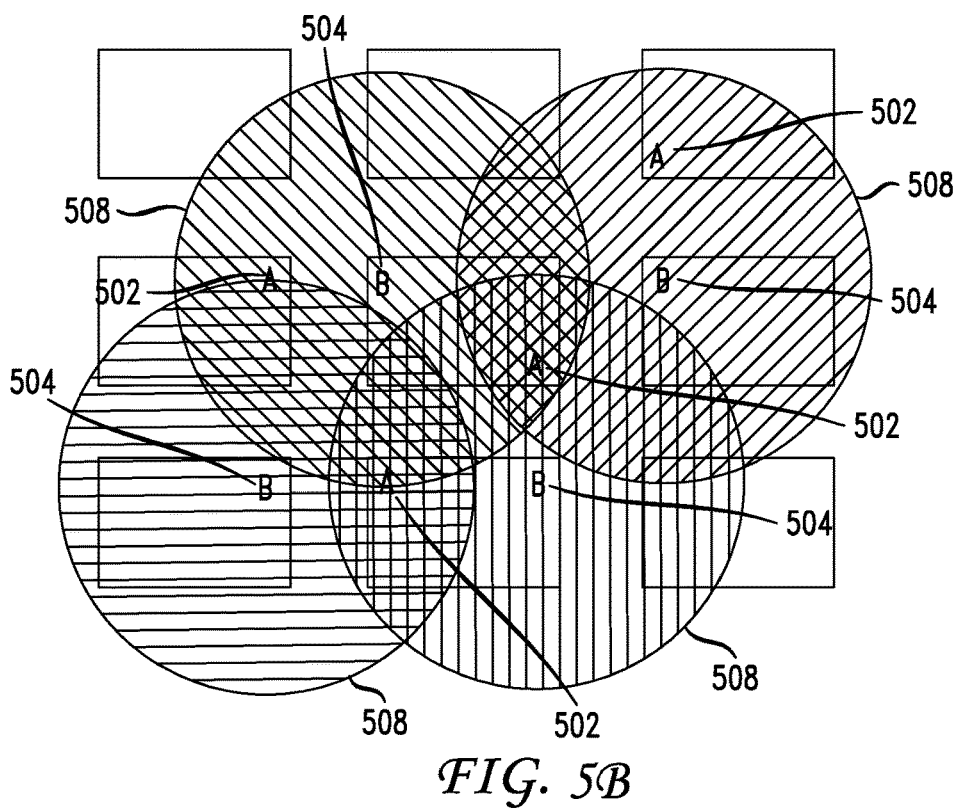

FIGS. 5A and 5B illustrate a city grid having a network with various nodes enabled. In the illustrated city grid, nodes are illustrated on the corners of city blocks, with paired nodes being located directly across the street from one another. Thus in this configuration, each "A" node 502 can be found directly across the street from a "B" node 504. As illustrated in FIG. 5A, the "A" nodes 502 are turned on, with the shaded regions 506 indicating the coverage area. This coverage area can correspond to a sensor range, a Wi-Fi range, a cellular range, a radio range, or any other ranged area.

As each active node uses energy, the nodes often cannot produce (via solar, wind, or other energy resources) enough energy to keep up with demand, and use stored battery power to augment power generation capabilities. Once the stored energy in either the inactive node or the active node reaches a defined threshold, the active and inactive nodes switch, with the inactive going active and the active node going inactive, in order to maintain continuity of service. This switch allows the inactive node to store energy for when placed in an active configuration. Additional power considerations can be calculated by a server, remote management system (e.g., remote device 252), or other control node, which can look at long-term power trends and activity, and make determinations for upgrading, changing, or modifying either nodes, node locations, node pairings, node configurations, or power usage schedules.

FIG. 5B illustrates when the "B" nodes 504 have become active, resulting in ranges 508 which are distinct from the ranges 506 present when the "A" nodes 502 are active. It is noted that while all the "A" nodes 502 are simultaneously active in FIG. 5A, and all the "B" nodes 504 are simultaneously active in FIG. 5B, this is for illustration purposes only. Actual activity of nodes in the mesh network can be a mix of nodes because determinations are made based on power at the respective nodes, usage, signal ranges, trends, anticipated usage, status of other nodes in the mesh network, etc. It is further noted that the ranges illustrated in FIGS. 5A and 5B are not identical because the nodes which are active/inactive in each illustration are distinct, and thus the coverage area is illustrated as having shifted for each pair.

The placement of nodes can be determined so that continuous coverage can be provided regardless of usage, battery levels, trends, schedules, etc. In other words, overlap between the nodes is expected to occur to foster continuous coverage. However, in configurations where power has a higher priority than coverage, coverage might not overlap completely and may have holes or gaps of coverage based on the particular needs at the circumstances.

Similarly, various configurations might not have continuous coverage based on time. That is, rather than always having an active node and an inactive node in a pair of nodes, the needs of the system could be that while one node is the "active" node, measurements are only taken once a day or once an hour. In such a situation, because of the energy use which occurs the nodes still switch between active/inactive states, however there are no constant measurements being taken. Likewise, in a Wi-Fi situation, while the active node can be actively receiving signals, the node may not be actively broadcasting data.

Figure 6:
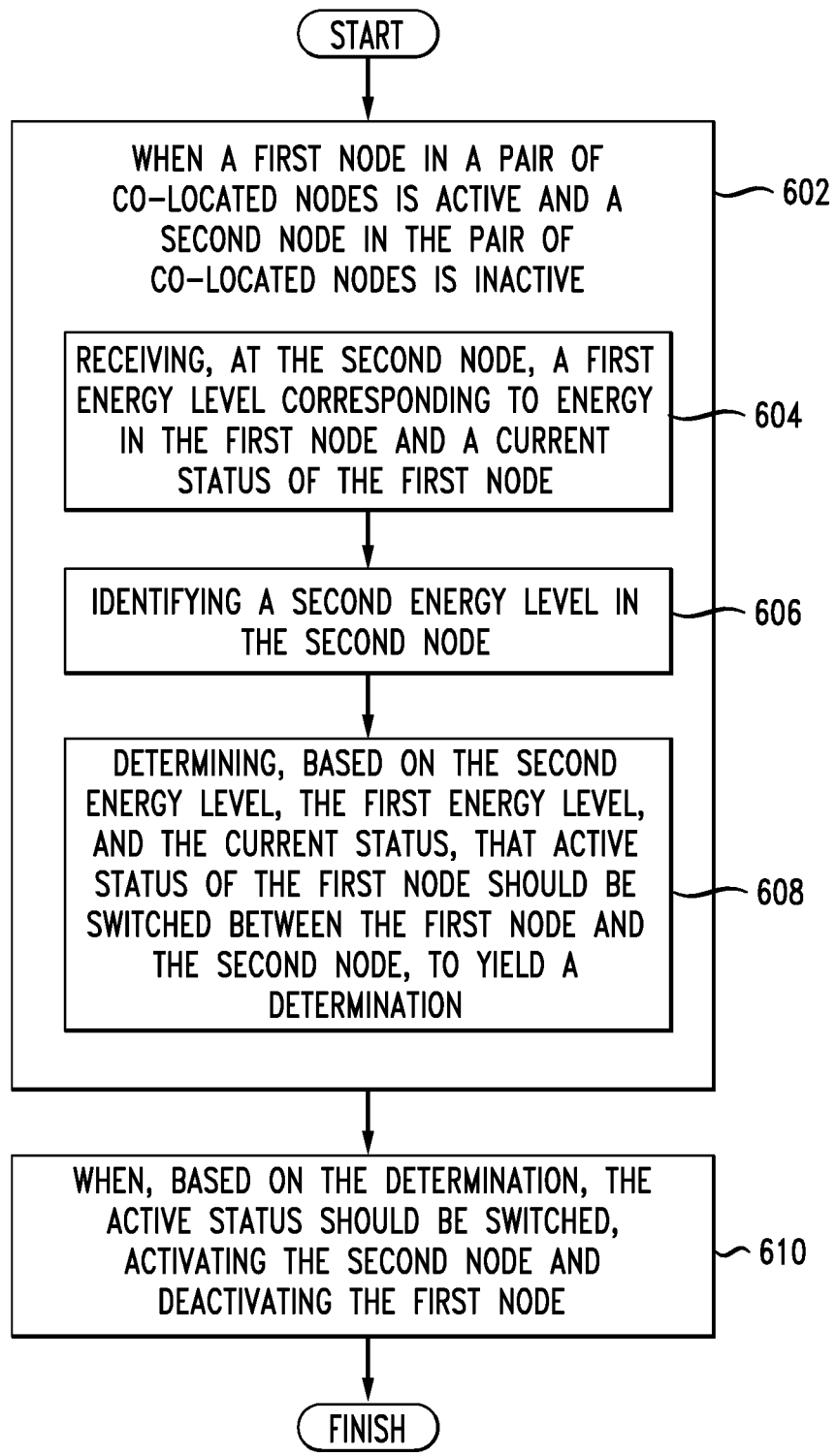
FIG. 6 illustrates an exemplary method embodiment.

Having disclosed some basic system components and concepts, the disclosure now turns to the exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 in one embodiment is a node in a pair of nodes. The nodes are co-located, and are embedded in objects which are generally publically available. For example, each node could be a bench, a storage receptacle, a stoplight, a telephone pole, a post, a light, and/or a guardrail. When a first node in a pair of co-located nodes is active and a second node in the pair of co-located nodes is inactive (602), the system 100 performs various steps based on configuration and embodiment desired. The co-located nodes can be part of a mesh network, where nodes can communicate with one another. The nodes are classified as "co-located" based on their respective locations being within a threshold distance of one another. The threshold distance can be based on specific distances, such as a city block, or can be based on coverage areas of the first node, the second node, and other nodes in the mesh network. An "active" status can indicate the node can identify non-control data via a sensor. Exemplary sensors include pollution sensors, light sensors, weather sensors, movement sensors, or any other type of sensor. An "active" status can also indicate that the node is transmitting and/or receiving wireless data, such as a Wi-Fi signal, a cellular signal, a radio signal, or other electromagnetic signal.

Exemplary steps the system 100 can take include, acting in the role of the second node in the pair of co-located nodes, receiving a first energy level corresponding to energy in the first node and a current status of the first node (604). This information can inform the system 100 how long the first node has until reaching a critical level or until the first node can no longer operate. The system 100 can also receive additional information from other nodes in the mesh network, such as coverage information of those other nodes. The system 100 can also identify a second energy level in the second node. That is, the system 100 can identify its own power level (606), as well as how fast it is charging, how fast it discharges when active, how fast the other node is discharging, needs of other nodes in the mesh network, etc.

Based on the second energy level (i.e., the system 100 power level), the first energy level (the energy of the active node), and the current status, the system 100 can determine that active status of the first node should be switched between the first node and the second node (608). Based on this determination, the system 100 activates the second node and deactivates the first node (610). Such activation/deactivation can occur based on a control signal which is generated by the second node, or can be initiated by a master node or server. The first node will then be able to begin storing energy reserves, using solar power or other means, while the now active second node will begin depleting the second node reserves.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    at a first time, operating a first node of a pair of nodes in an active status in which the first node is serving a geographic location with a wireless communication service, the pair of nodes comprising the first node and a second node, the pair of nodes being co-located and paired for a purpose of both the first node and the second node serving the geographic location with the wireless communication service, wherein at the first time, the first node has an energy level that is higher than an energy level of the second node, the second node of the pair of nodes operates in an inactive status such that the second node is not providing the wireless communication service to the geographic location and is collecting and storing energy for later use;
    determining, based on the energy level and a rate of energy discharge of one of the first node and the energy level of the second node, that the first node should change from the active status to the inactive status; and
    based on the determination, and at a second time which is later than the first time:
        changing the first node from the active status to the inactive status such that the first node is not providing the wireless communication service to the geographic location and is collecting and storing energy for later use; and
        changing the second node from the inactive status to the active status such that the second node, rather than the first node, serves the geographic location with the wireless communication service.

2. The method of claim 1, wherein the first node comprises one of a receptacle a light post, a stoplight, a post, a guardrail, a sign, and a bench.

3. The method of claim 2, where the first node comprises a solar powered node and wherein the energy level comprises a first node energy level.

4. The method of claim 1, where in the pair of nodes are paired such that they communicate with each other and coordinate which node of the pair of nodes will provide the wireless communication service to the geographic location.

5. The method of claim 1, wherein the active status comprises providing the wireless mitigation service for mobile devices to access the Internet.

6. The method of claim 1, where the pair of nodes is paired at least in part based on the first node in the second node being located within a threshold distance of one another.

7. The method of claim 1, wherein the pair of nodes is part of a mesh network of nodes.

8. A system comprising:
    a processor; and
    a computer readable storage device storing instructions which, when executed by the processor, cause the processor to perform operations comprising:
    at a first time, operating a first node of a pair of nodes in an active status in which the first node is serving a geographic location with a wireless communication service, the pair of nodes comprising the first node and a second node, the pair of nodes being co-located and paired for a purpose of both the first node and the second node serving the geographic location with the wireless communication service, wherein at the first time, the first node has an energy level that is higher than an energy level of the second node, the second node of the pair of nodes operates in an inactive status such that the second node is not providing the wireless communication service to the geographic location and is collecting and storing energy for later use;

determining, based on the energy level and a rate of energy discharge of one of the first node and the energy level of the second node, that the first node should change from the active status to the inactive status; and based on the determination, and at a second time which is later than the first time:
  changing the first node from the active status to the inactive status such that the first node is not providing the wireless communication service to the geographic location and is collecting and storing energy for later use; and
  changing the second node from the inactive status to the active status such that the second node, rather than the first node, serves the geographic location with the wireless communication service.

9. The system of claim 8, wherein the first node comprises one of a receptacle a light post, a stoplight, a post, a guardrail, a sign, and a bench.

10. The system of claim 9, where the first node comprises a solar powered node and wherein the energy level comprises a first node energy level.

11. The system of claim 8, where in the pair of nodes are paired such that they communicate with each other and coordinate which node of the pair of nodes will provide the wireless communication service to the geographic location.

12. The system of claim 8, wherein the active status comprises providing the wireless mitigation service for mobile devices to access the Internet.

13. The system of claim 8, where the pair of nodes is paired at least in part based on the first node in the second node being located within a threshold distance of one another.

14. A computer readable storage device storing instructions which, when executed by a processor, cause the processor to perform operations comprising:
  at a first time, operating a first node of a pair of nodes in an active status in which the first node is serving a geographic location with a wireless communication service, the pair of nodes comprising the first node and a second node, the pair of nodes being co-located and paired for a purpose of both the first node and the second node serving the geographic location with the wireless communication service, wherein at the first time, the first node has an energy level that is higher than an energy level of the second node, the second node of the pair of nodes operates in an inactive status such that the second node is not providing the wireless communication service to the geographic location and is collecting and storing energy for later use;
  determining, based on the energy level and a rate of energy discharge of the first node and the energy level of the second node, that the first node should change from the active status to the inactive status; and
  based on the determination, and at a second time which is later than the first time:
    changing the first node from the active status to the inactive status such that the first node is not providing the wireless communication service to the geographic location and is collecting and storing energy for later use; and
    changing the second node from the inactive status to the active status such that the second node, rather than the first node, serves the geographic location with the wireless communication service.

15. The computer readable storage device of claim 14, wherein the first node comprises one of a receptacle a light post, a stoplight, a post, a guardrail, a sign, and a bench.

16. The computer readable storage device of claim 15, where the first node comprises a solar powered node and wherein the energy level comprises a first node energy level.

17. The computer readable storage device of claim 14, where in the pair of nodes are paired such that they communicate with each other and coordinate which node of the pair of nodes will provide the wireless communication service to the geographic location.

18. The computer readable storage device of claim 14, wherein the active status comprises providing the wireless mitigation service for mobile devices to access the Internet.

19. The computer readable storage device of claim 14, where the pair of nodes is paired at least in part based on the first node in the second node being located within a threshold distance of one another.

20. The computer readable storage device of claim 14, wherein the pair of nodes is part of a mesh network of nodes.

21. The method of claim 1, further comprising predicting a time that is later than the first time, for changing the first node from the active status to the inactive status based on the rate of energy discharge of the first node.

22. The method of claim 1, wherein the determining that the first node should change from the active status to the inactive status is further based on a rate of energy charge of the second node.

23. The system of claim 8, further comprising predicting a time that is later than the first time, for changing the first node from the active status to the inactive status based on the rate of energy discharge of the first node.

24. The system of claim 8, wherein the determining that the first node should change from the active status to the inactive status is further based on a rate of energy charge of the second node.

25. The computer readable storage device of claim 14, further comprising predicting a time that is later than the first time, for changing the first node from the active status to the inactive status based on the rate of energy discharge of the first node.

26. The computer readable storage device of claim 14, wherein the determining that the first node should change from the active status to the inactive status is further based on a rate of energy charge of the second node.

* * * * *